United States Patent [19]
Yagi et al.

[11] Patent Number: 5,295,036
[45] Date of Patent: Mar. 15, 1994

[54] LIGHTING CIRCUIT FOR VEHICULAR DISCHARGE LAMP

[75] Inventors: Soichi Yagi; Atsushi Toda; Akiyoshi Ozaki; Akihiro Matsumoto, all of Shimizu, Japan

[73] Assignee: Koito Manufacturing Co., Ltd., Tokyo, Japan

[21] Appl. No.: 748,113

[22] Filed: Aug. 21, 1991

[30] Foreign Application Priority Data

Sep. 25, 1990 [JP] Japan .................................. 2-254953

[51] Int. Cl.$^5$ ............................................. H02H 3/28
[52] U.S. Cl. ........................................ 361/79; 361/86; 361/87
[58] Field of Search ................. 361/86, 79, 90, 94, 361/92, 91, 87; 315/308

[56] References Cited

U.S. PATENT DOCUMENTS

| | | | |
|---|---|---|---|
| 3,999,100 | 12/1976 | Dendy et al. | 315/308 |
| 4,039,897 | 8/1977 | Dragoset | 315/205 |
| 4,121,136 | 10/1978 | Fournier et al. | 315/205 |
| 4,206,385 | 6/1980 | Wisbey | 315/119 |
| 4,207,500 | 6/1980 | Duve et al. | 315/119 |
| 4,240,009 | 12/1980 | Paul | 315/224 |
| 4,337,418 | 6/1982 | Walz | 315/362 |
| 4,450,384 | 5/1984 | Krokaugger | 315/127 |
| 4,585,623 | 4/1986 | Bello et al. | 361/90 |
| 4,667,131 | 5/1987 | Nilssen | 315/275 |
| 4,724,360 | 2/1988 | Luursema | 315/244 |
| 4,763,044 | 8/1988 | Nuckolls et al. | 315/176 |
| 4,766,350 | 8/1988 | Husgen et al. | 315/207 |
| 4,797,599 | 1/1989 | Ference et al. | 315/194 |
| 4,860,149 | 8/1989 | Johnston | 361/79 |
| 4,904,907 | 2/1990 | Allison et al. | 315/307 |
| 4,914,355 | 4/1990 | Mertens et al. | 315/307 |
| 4,979,066 | 12/1990 | Kawata et al. | 361/79 |
| 4,992,702 | 2/1991 | Shimizu et al. | 315/219 |
| 5,140,229 | 8/1991 | Yagi et al. | 315/307 |
| 5,142,203 | 8/1992 | Oda et al. | 315/308 |

FOREIGN PATENT DOCUMENTS

4002334 1/1990 Fed. Rep. of Germany .
4017415 5/1990 Fed. Rep. of Germany .

*Primary Examiner*—Todd DeBoer
*Attorney, Agent, or Firm*—Sughrue, Mion, Zinn, Macpeak & Seas

[57] ABSTRACT

A lighting circuit for a vehicular discharge lamp having a DC voltage booster circuit for boosting an input voltage from a DC voltage input terminal, comprises a current detector, a voltage detector, an abnormality judging circuit, and a power cutoff relay circuit. The current detector acquires a detection signal concerning an output current of the DC voltage booster circuit. The voltage detector acquires a detection signal concerning an output voltage of the DC voltage booster circuit. The abnormality judging circuit compares the levels of the detection signals from the current detector and the voltage detector with each other to determine whether or not the lighting circuit is in an abnormal status. The power cutoff circuit inhibits power supply to the discharge lamp upon reception of a signal from the abnormality judging circuit representing an abnormality in the lighting circuit.

18 Claims, 5 Drawing Sheets

LIGHTING CIRCUIT FOR VEHICULAR DISCHARGE LAMP

BACKGROUND OF THE INVENTION

1. Field of the Invention

The present invention generally relates to a novel lighting circuit for a vehicular discharge lamp. More particularly, this invention pertains to a novel lighting circuit for a vehicular discharge lamp, which can detect an abnormal status of the circuit for protection against possible damage and can prevent a user from receiving an electric shock when replacing the lamp.

2. Description of the Related Art

In a lighting circuit for an incandescent lamp, a widely-used light source for vehicular headlamps, a relay coil is connected via a lighting switch between the terminals of a battery, and the incandescent lamp is connected via a relay contact between the battery terminals.

When an abnormality occurs in the operational status of such a lighting circuit for an incandescent lamp due to expiration of the service life of the lamp or the like, the worst possible consequence would be disconnection of the filament. No particular protection circuit is typically provided.

Metal halide lamps have recently been receiving greater attention as a new light source replacing the incandescent lamp. To use this metal halide lamp as a vehicular headlamp, it is necessary to instantaneously light or relight the lamp. The activation voltage for this event is very high (about 10 to 20 kV).

When setting the lighting switch on does not light the lamp because of occurrence of some abnormality in the lamp originating from the expired service life of the lamp or the like, a high voltage keeps appearing between the output terminals of the lighting circuit. As a result, a dielectric breakdown may occur in contact terminals provided in the socket where the lamp is installed, thus causing fire. There is also a possibility that a user will receive an electric shock, replacing the bad lamp without knowing a high voltage applied to the lamp.

Further, when the output current or output voltage of a DC voltage booster circuit, one component of the light circuit, the circuit elements may be damaged or the lighting circuit may malfunction due to the damage, thus generating a high voltage (which will cause troubles brought about by electromagnetic interference) and damaging the lamp.

SUMMARY OF THE INVENTION

Accordingly, it is an object of the present invention to provide an improved lighting circuit for a vehicular discharge lamp, which can overcome the above shortcomings.

To achieve the object, according to one aspect of the present invention, there is provided a lighting circuit for a vehicular discharge lamp having a DC voltage booster circuit for boosting an input voltage from a DC voltage input terminal, which comprises a current detector for acquiring a detection signal concerning an output current of the DC voltage booster circuit, a voltage detector for acquiring a detection signal concerning an output voltage of the DC voltage booster circuit, an abnormality judging circuit for comparing levels of the detection signals from the current detector and the voltage detector with each other to determine whether or not the lighting circuit is in an abnormal status, and a power cutoff circuit for inhibiting power supply to the discharge lamp upon reception of a signal from the abnormality judging circuit representing an abnormality in the lighting circuit.

With this arrangement, it is possible to determine whether or not the lighting circuit is normal or abnormal, based on the correlation between the output voltage and output current of the DC voltage booster circuit, and power supply to the discharge lamp will be stopped when it is judged that some abnormality has occurred. It is therefore possible to protect the lighting circuit and discharge lamp as well as prevent the abnormality-originating damages. In addition, this can be realized without the need to provide an abnormality detecting circuit for every cause of the abnormality, ensuring the simplified circuit structure.

BRIEF DESCRIPTION OF THE DRAWINGS

FIG. 1 is a circuit block diagram illustrating the general circuit structure;

FIG. 2 is a circuit diagram of essential portions of the lighting circuit;

FIG. 3 is a graph representing the relation between the output voltage and output current of a DC voltage booster circuit;

FIG. 4 is a schematic diagram used for explaining the inclination of a judging line; and FIG. 5 is a circuit diagram showing a modification of an abnormality judging circuit.

DETAILED DESCRIPTION OF THE PREFERRED EMBODIMENT

A preferred embodiment of a lighting Circuit for a vehicular discharge lamp according to the present invention will be described in detail below with reference to the accompanying drawings. The illustrated embodiment is a lighting circuit particularly designed for a metal halide lamp for automobiles.

GENERAL STRUCTURE

Figure 1:
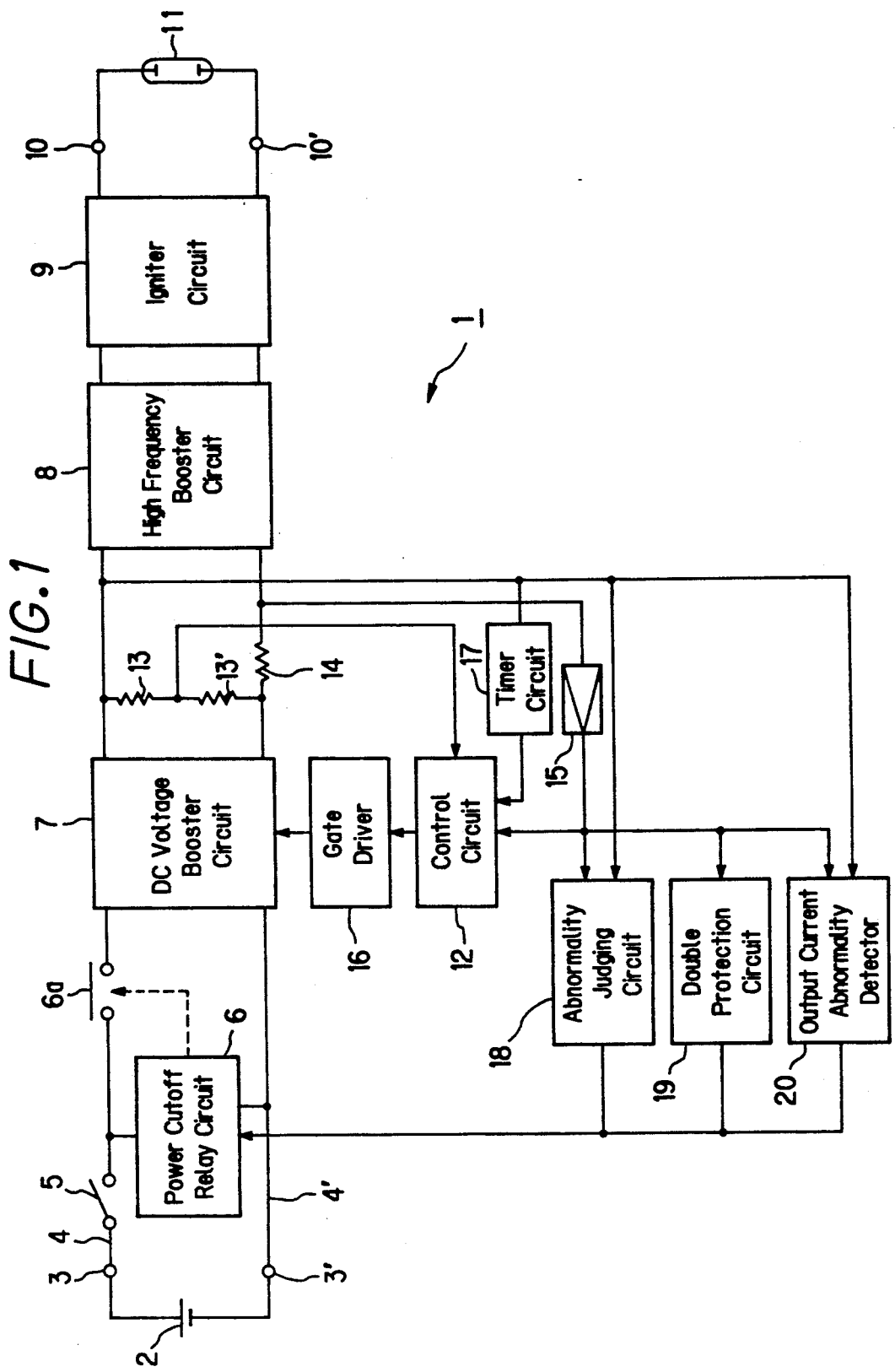
FIGS. 1 through 5 illustrate one embodiment of a lighting circuit for a vehicular discharge lamp according to the present invention.

Referring to FIG. 1, individual components of a lighting circuit 1 has a battery 2, connected between input terminals 3 and 3' thereof, a lighting switch 5, a power cutoff relay circuit 6, a DC voltage booster circuit 7, a high frequency booster circuit 8, an igniter circuit 9, a control circuit 12, a gate driver 16, a timer circuit 17, an abnormality judging circuit 18, a double protection circuit 19, and an output current abnormality detector 20. Reference numerals 4 and 4' denote DC power supply lines. The lighting switch 5 is connected to the positive line 4.

The power cutoff relay circuit 6 is provided to inhibit the supply of a battery voltage to circuits located at the subsequent stages when an abnormality occurs in the lighting circuit 1. More specifically, upon reception of signals from the abnormality judging circuit 18, double protection circuit 19 and output current abnormality detector 20, all to be described in detail later, the power cutoff relay circuit 6 sets off its relay to thereby open a relay contact 6a provided on the positive line 4.

The DC voltage booster circuit 7, provided at the subsequent stage of the power cutoff relay circuit 6, boosts a battery voltage under the boost control of the control circuit 12 (to be described later).

The high frequency booster circuit 8 is provided at the subsequent stage of the DC voltage booster circuit 7. This booster circuit 8 converts the DC voltage of the DC voltage booster circuit 7 into a sinusoidal AC voltage. An inverter circuit of a push/pull type may serve as the high frequency booster circuit 8.

The igniter circuit 9 is provided at the subsequent stage of the high frequency booster circuit 8. Between AC output terminals 10 and 10' of the circuit 9 is connected a metal halide lamp 11 having rated power of 35 W.

The control circuit 12 serves to control the output voltage of the DC voltage booster circuit 7. The control circuit 12 receives a voltage detection signal corresponding to the output voltage of the DC voltage booster circuit 7, which is detected by voltage dividing resistors 13 and 13' provided the output terminals of the booster circuit 7. The between control circuit 12 also receives a current detection signal corresponding to the output current of the booster circuit 7 through an amplifier 15. Before entering the amplifier 15, this detection signal has been converted into a voltage by a current-detecting resistor 14 provided on the ground line 4', connecting the DC voltage booster circuit 7 and the high frequency booster circuit 8. The control circuit 12 generates a control signal according to these detection signals, and sends the control signal to the DC voltage booster circuit 7 via the gate driver 16 to control the output voltage of the circuit 7.

The control circuit 12 further receives the output voltage of the DC voltage booster circuit 7 via the timer circuit 7. In the case where the lamp is lit again, the control circuit 12 is adapted to shift a time for ensuring transition to constant power control of the lamp upon elapse of a time period corresponding to a turn-off time of the lamp after the lamp is turned off.

The abnormality judging circuit 18 receives the output voltage of the DC voltage booster circuit 7 and a signal from the amplifier 15 corresponding to the output current of the circuit 7. The judging circuit 18 judges whether an abnormality has occurred in the lighting circuit from the level difference between the output voltage of the booster circuit 7 and the amplified signal, and sends its output signal to the power cutoff relay circuit 6. The abnormal states of the lighting circuit may include a lighting abnormality of the metal halide lamp 11 (short-circuited or open-circuit state of the lamp) and the open circuit of the high frequency booster circuit 8 at the output stage. When detecting such an abnormal state of the lighting circuit 1, the abnormality judging circuit 18 sends its output signal to the power cutoff relay circuit 6 to cut off the power supply to the DC voltage booster circuit 7 from the battery 2.

The double protection circuit 19 serves as a protective measure against the worst case where the abnormality judging circuit 18 does not function for some reasons though an abnormality has occurred in the lighting circuit 1. This protection circuit 19 receives the detection signal concerning the output current of the DC voltage booster circuit 7 through the amplifier 15. The circuit 19 compares the received signal with a reference value, and discriminates that an abnormality has occurred when the state of the output current of the booster circuit 7 being equal to or below a predetermined value continues for a predetermined period of time or longer. The circuit 19 then sends its output signal to the power cutoff relay circuit 6 to inhibit power supply from the battery 2 to the booster circuit 7.

The output current abnormality detector 20 is provided for circuit protection when the output stage of the high frequency booster circuit 8 becomes short-circuited. More specifically, the abnormality detector 20 receives a detection signal concerning the output current of the DC voltage booster circuit 7 through the amplifier 15, and determines the occurrence of an abnormality when the output current of the booster circuit 7 becomes equal to or greater than a reference value, sending its output signal to the power cutoff relay circuit 6 to inhibit the supply of the voltage from the battery 2 to the booster circuit 7.

The output current abnormality detector 20 always monitors the output voltage of the DC voltage booster circuit 7 to discriminate whether the metal halide lamp 11 is in a state where lighting has just started or in a normal state. According to the decision result, the abnormality detector changes the reference value used for comparison with the output current of the booster circuit 7 for the following reason. Since the output current of the booster circuit 7 at the beginning of lighting the metal halide lamp 11 is large, it is necessary to reduce the possibility of this event being erroneously judged as having originated from the short-circuiting of the high frequency booster circuit 8 at the normal time, and to clearly distinguish the value of the output current from the reference value.

Figure 2:
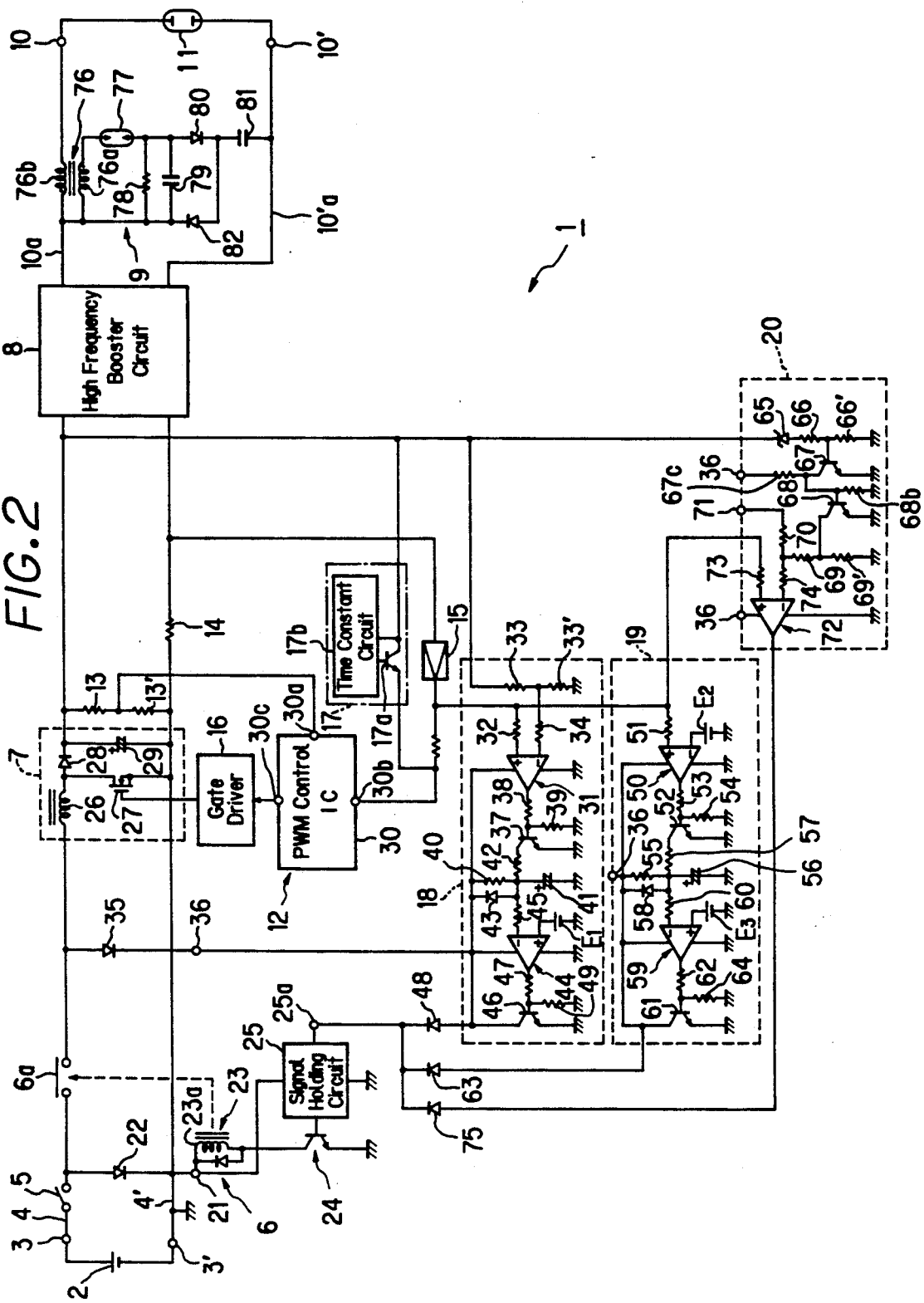

Essential portions of the lamp lighting circuit 1 will be described in detail below referring to FIG. 2.

Power Cutoff Relay Circuit

A power supply terminal 21 is connected via a reverse voltage protecting diode 22 to the output-side terminal of the lighting switch 5.

A relay 23 has a coil 23a with one end connected to the power supply terminal 21 and the other end connected to the collector of an NPN transistor 24. The contact 6a is open or closed according to the excitation/deexcitation of the coil 23a.

A signal holding circuit 25 receives signals at its input terminal 25a from the abnormality judging circuit 18, the double protection circuit 19, and the output current abnormality detector 20. When the input terminal 25a becomes an H level, the circuit 25 holds this level, turning off the transistor 24.

As a result, the relay 23 is turned off, and the power supply to the DC voltage booster circuit 7 is cut off. This status should continue unless the lighting switch 5 is set on again after it has been temporarily set off.

DC Voltage Booster Circuit

The DC voltage booster circuit 7, constituted as a chopper type DC-to-DC converter, includes an inductor 26 connected to the positive line 4, an N channel FET 27, a rectifier diode 28 and a smoothing capacitor 29. The FET 27 is located at the subsequent stage of the inductor 26 and is connected between the positive line 4 and the ground line 4'. The FET 27 performs its switching operation in response to a control pulse sent through the gate driver 16 from the control circuit 12. The rectifier diode 28 has its anode connected to the drain of the FET 27 on the positive line 4. The smoothing capacitor 29 is connected between the cathode of the rectifier diode 28 and the ground line 4'. The inductor 26 stores energy when the FET 27 becomes conductive in response to the control pulse sent via the gate driver 16 from the control circuit 12. When the FET 27 becomes nonconductive, the inductor 26 releases the stored energy, with the consequent superposition of the corresponding voltage on the input voltage, thereby boosting the DC voltage. That is, the boosting ratio is controlled in accordance with the duty cycle of the control pulse.

Control Circuit and Timer Circuit

The control circuit 12 receives detection signals concerning the output voltage and the output current of the DC voltage booster circuit 7. The control circuit 12 performs PWM (Pulse Width Modulation) control according to these signals to control the switching of the FET 27 of the booster circuit 7, thereby varying the output voltage of the circuit 7.

A PWM control IC 30 receives, at its input terminal 30a, the voltage detection signal acquired by the voltage-dividing resistors 13 and 13'. At its input terminal 30b, the IC 30 also receives a current detection signal sent through the amplifier 15 and a resistor from the current-detecting resistor 14. When these detection signals are respectively input to two error amplifiers (not shown), these are compared with a predetermined reference voltage. Then, a pulse signal, having a duty cycle resulting from the comparison of the analog OR (sum) output obtained from the error outputs with a sawtooth waveform, is output from an output terminal 30c.

This pulse signal is then sent via the gate driver 16 to the gate of the FET 27 of the DC voltage booster circuit 7. To the input terminal 30b of the PWM control IC 30, the output voltage of the DC voltage booster circuit 7 is input via the timer circuit 17. The timer circuit 17 includes an active switch element 17a and a time constant circuit 17b. When a period of time specified by the time constant circuit 17b (which corresponds to the lamp-OFF time) elapses from the point at which the lighting switch 5 is set on, the active switch element 17a is activated and the output voltage of the booster circuit 7 is applied to the input terminal 30b of the PWM control IC 30.

Abnormality Judging Circuit

A comparator 31 has its positive input terminal connected via a resistor 32 to the output terminal of the amplifier 15. The negative input terminal of the comparator 31 is supplied through a resistor 34 with a voltage acquired by voltage-dividing the output voltage of the DC booster voltage circuit 7 by the voltage-dividing resistors 33 and 33'.

The power supply voltage for the comparator 31 comes through a power terminal 36 from subsequent stage of the relay contact 6a, passing through a diode 35.

An emitter-grounded NPN transistor 37 has its base connected via a resistor 38 to the output terminal of the comparator 31, with a resistor 39 inserted between the base and emitter of the transistor 37.

A resistor 40 has one end connected to the power terminal 36, and the other end is grounded via a capacitor 41 as well as connected via a resistor 42 to the collector of the transistor 37.

A diode 43, provided in parallel to the resistor 40, has its cathode connected to the power terminal 36 and its anode connected between the resistor 40 and the capacitor 41. A comparator 44 has its negative input terminal connected via a resistor 45 between the resistor 40 and the capacitor 41, and its positive input terminal applied with a predetermined reference voltage (indicated by constant voltage source $E_1$). The positive-side power terminal of the comparator 44 is connected to the power terminal 36.

An emitter-grounded NPN transistor 46 has its base connected via a resistor 47 to the output terminal of the comparator 44, and its collector is connected to the power terminal 36 and to the input terminal 25a of the signal holding circuit 25 via a diode 48.

A resistor 49 is connected between the base and emitter of the transistor 46.

In this abnormality judging circuit 18, when a voltage resulting from voltage-division of the output voltage of the DC voltage booster circuit 7 is greater than the output voltage of the amplifier 15, the output of the comparator 31 becomes an L level, turning off the transistor 37. As a result, the comparator 44 outputs an L-level signal, thus turning off the transistor 46.

Double Protection Circuit

A comparator 50 has its positive input terminal connected via a resistor 51 to the output terminal of the amplifier 15. The negative input terminal of the comparator 50 is supplied with a predetermined reference voltage (indicated by constant voltage source $E_2$). The positive-side power terminal of the comparator 50 is connected to the power terminal 36.

An emitter-grounded NPN transistor 52 has its base connected via a resistor 53 to the output terminal of the comparator 50, with a resistor 54 inserted between the base and emitter of the transistor 52.

A resistor 55 has one end connected to the power terminal 36, and the other end is grounded via a capacitor 56 as well as connected via a resistor 57 to the collector of the transistor 52.

A diode 58 has its cathode connected to the power terminal 36 and its anode connected between the resistor 55 and the capacitor 56.

A comparator 59 has its negative input terminal connected via a resistor 60 between the resistor 55 and the capacitor 56, and its positive input terminal is applied with a predetermined reference voltage (indicated by constant voltage source $E_3$).

An emitter-grounded NPN transistor 61 has its base connected via a resistor 62 to the output terminal of the comparator 59, and its collector is connected to the power terminal 36 and to the input terminal 25a of the signal holding circuit 25 via a diode 63.

A resistor 64 is connected between the base and emitter of the transistor 61.

In this double protection circuit 19, when the state that the output current of the DC voltage booster circuit 7 is smaller than a predetermined level continues for a predetermined period of time or longer, the output of the comparator 50 becomes an L level, turning off the transistor 52. As a result, the capacitor 56 is charged. When the voltage level at the negative input terminal of the comparator 59 becomes equal to or greater than the predetermined reference value $E_3$, the comparator 59 outputs an L-level signal, thus turning off the transistor 61.

Output Current Abnormality Detector

A Zener diode 65 has its cathode connected to the positive output terminal of the DC voltage booster circuit 7 and its anode grounded via resistors 66 and 66' in series.

An emitter-grounded NPN transistor 67 has its base connected between the resistors 66 and 66' and its collector connected through a resistor 67c to the power terminal 36.

An emitter-grounded NPN transistor 68, located at the subsequent stage of the transistor 67, has its base connected to the collector of the transistor 67, with a resistor 68b connected between the base and emitter of the transistor 68.

Resistors 69 and 69' are connected in series. The resistor 69 has one end connected via a resistor 70 to a power terminal 71, and the other end is grounded via the resistor 69' and connected to the collector of the transistor 68.

The power terminal 71 is applied with a voltage generated from a reference voltage generator (not shown) which is provided in the PWM control IC 30. This voltage is stable and unaffected by a variation in battery voltage.

A comparator 72 has its positive input terminal connected through a resistor 73 to the output terminal of the amplifier 15 and its negative input terminal connected via a resistor 74 to the resistor 70. The output terminal of the comparator 72 is connected via a diode 75 to the input terminal 25a of the signal holding circuit 25. The power supply voltage for the comparator 72 comes from the power terminal 36.

In the output current abnormality detector 20, when the output current of the DC voltage booster circuit 7 becomes greater than a reference level, the output signal of the comparator 72 has an H level, but the reference voltage of the negative input side of the comparator 72 is determined according to the output voltage of the DC voltage booster circuit 7. More specifically, as the output voltage of the booster circuit 7 is large at the beginning of the lighting of the metal halide lamp 11, enabling the Zener diode 65 turns on the transistor 67 and turns off the transistor 68, increasing the reference voltage. In the normal lighting state, the transistor 67 is in an OFF state and the transistor 68 is turned on, reducing the reference voltage.

High Frequency Booster Circuit

A self-exciting push/pull type inverter circuit is used as the high frequency booster circuit 8. A pair of active switch elements provided on the side of the primary winding of the transformer are switched in the mutual opposite directions by a signal from the feedback winding of the transformer, so that the DC input voltage from the DC voltage booster circuit 7 is converted into a sinusoidal AC voltage as the output of the booster circuit 8.

Igniter Circuit

A trigger transformer 76 has a primary winding 76a and a secondary winding 76b. The secondary winding 76b is provided on a line 10a connecting one output terminal of the high frequency booster circuit 8 and an AC output terminal 10. The primary winding 76a has one end connected to that end of the secondary winding 76b which is located on the side of the high frequency booster circuit 8, with a spark gap element 77 provided on the other end side of the primary winding 76a.

A resistor 78 is connected in parallel to the primary winding 76a of the trigger transformer 76 and the spark gap element 77. A capacitor 79 is connected in parallel to the resistor 78.

A diode 80 has its anode connected to the gap element 77 and its cathode connected via a capacitor 81 to a line 10'a which connects the output terminal of the high frequency booster circuit 8 to an AC output terminal 10'.

A diode 82 has its cathode connected to that terminal of the capacitor 79 which is connected to the line 10a, and its anode is connected to the cathode of the diode 80.

The igniter circuit 9 is activated when the lighting switch is set on. The output voltage of the booster circuit 8 is 5 high until the metal halide lamp 11 is lit. When the terminal voltage of the capacitor 79 exceeds a predetermined value, the spark gap element is rendered conductive, generating a high-voltage trigger pulse. This terminal voltage is superimposed on the AC output voltage of the booster circuit 8, then it is applied to the metal halide lamp 11. When the lamp 11 is turned on, the output voltage of the booster circuit 8 falls, so that the terminal voltage of the capacitor 79 does not activate the gap element 77. As a result, no trigger pulse will be generated.

Operation

Figure 3:
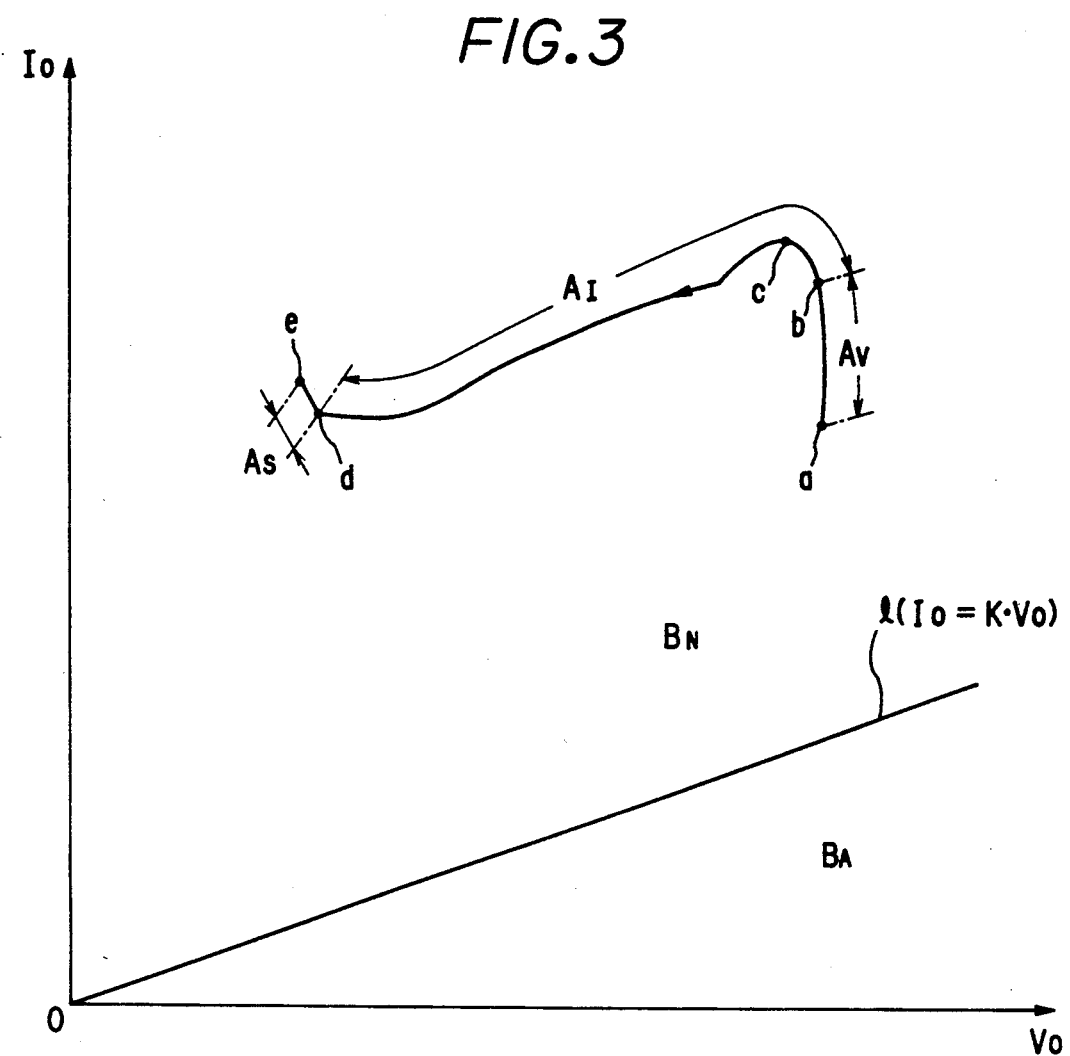
Figure 4:
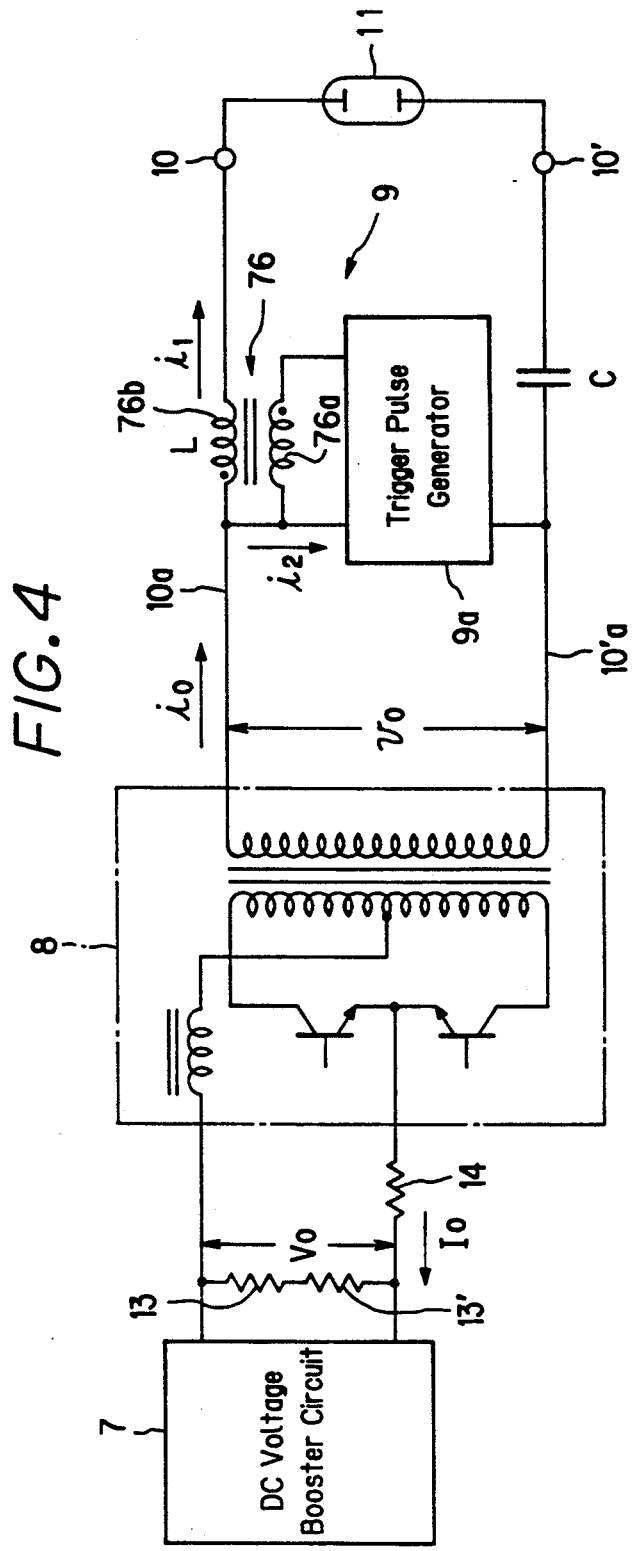

Referring now to FIGS. 3 and 4, the control operation of the lighting circuit 1 will be described with reference to two cases: the first case where the circuit status is not abnormal and the metal halide lamp 11 is lit immediately after the lighting switch 5 is set on (hereinafter referred to as "normal time") and the second case where an abnormality occurs in the circuit status (hereinafter referred to as "abnormal time").

FIG. 3 presents a graph illustrating the relation between the output voltage $V_O$ of the DC voltage booster circuit 7, taken on the horizontal axis, and the output current $I_O$ of the booster circuit 7, taken on the vertical axis.

Normal Time (FIG. 3)

First, a description will be given of the environment at the time of cold starting at which the lighting of the metal halide lamp 11 starts from the cold state.

In this case, immediately after closure of the lighting switch 5, the lamp 11 is triggered by the igniter circuit 9. Immediately after the lamp 11 is lit, however, the lamp voltage is low, and the output current $I_O$ of the DC voltage booster circuit 7 is small. Therefore, the duty cycle of the control pulse from the PWM control IC 30 is determined mainly by the voltage detection signal from the voltage-dividing resistors 13 and 13'.

The point "a" in FIG. 3 indicates the state immediately after the lighting of the lamp starts. A control region $A_V$ from the point "a" to the point "b" to which the output current $I_O$ increases, with the output voltage $V_O$ being approximately constant, is mainly under the control of the voltage detection signal.

As the output voltage $V_O$ of the DC booster circuit 7 gradually decreases, the duty cycle of the control pulse is determined by the current detection signal from the current-detecting resistor 14.

In FIG. 3, a control region $A_I$ from the point "b" to the point "d" passing through the peak point "c" of the output current $I_O$ is controlled mainly by the current detection signal.

When the active switch element 17a of the timer circuit 17 is turned on, the control transits to the constant power control mode for the lamp.

That is, since control is executed in such a way that the sum of the output voltage $V_O$ and the amplified output corresponding to the output current $I_O$ becomes a constant value, constant power control is realized in the form of a linear approximation, with $V_O \cdot I_O$ being constant. p A region $A_S$ from the point "d" to the point "e" in FIG. 3 is a constant power control region where the rated power is supplied to the metal halide lamp 11.

A description will now be given of the operation for lighting the metal halide lamp 11 again after it has been temporarily turned off.

The time constant circuit 17b of the timer circuit 17 is determined in advance according to the degree of reduction in temperature of the lamp after it is turned off. When the lighting switch 5 is closed again, therefore, the lighting control starts from the operational point in the control region in accordance with the physical conditions of the lamp.

For instance, in a case where the lamp is lit again after several tens of seconds have elapsed after the lamp has been previously turned off, the lighting of the lamp starts from the operational point in the control region $A_I$ and the control mode changes to constant power control. In a case where the metal halide lamp 11 is lit again after it is temporarily turned off for several seconds, the glass bulb of the lamp 11 is still hot. The lamp voltage and output current $I_O$ immediately after the relighting of the lamp 11 are high, and the timer circuit is immediately activated, thereby permitting a prompt shift to constant power control.

Abnormal Time (FIGS. 3 and 4)

A description will be given below of the circuit operation in the case where an abnormality occurs in the lighting circuit 1.

Discrimination of Abnormality Status

To begin with, a description will be given of how to discriminate the normal circuit state and the abnormal state on what reference.

In the $V_O$-$I_O$ characteristic in FIG. 3, a straight line 1 (which can be expressed by $I_O = k \cdot V_O$) given an inclination ("k") indicates the decision line for deciding the normal state or abnormal state, the region being bisected by the line 1.

In other words, an arbitrary point ($V_O$, $I_O$) in the $V_O$-$I_O$ characteristic diagram represents an operational status of the circuit and the separating the regions is effected depending on whether this point lies above the decision line 1 or below.

The aforementioned control curve belongs to the upper region lying above the decision line 1 (i.e., the region expressed by $I_O > k \cdot V_O$ and denoted by "$B_N$"), and this region can be considered to be a normal operation region in the sense that the operation point lies on the control curve at the normal time.

Further, in the lower region lying below the decision line 1 (i.e., the region expressed by $I_O < k \cdot V_O$ and denoted by "$B_A$"), power loss by the trigger transformer 76 or the power consumed in the igniter circuit 9 increases with respect to the power supplied to the lamp, disabling the normal power supply to the lamp and inhibiting the maintenance of the lighting.

The reason for this will be described referring to FIG. 4 which illustrates a simplified model of the lighting circuit 1.

In FIG. 4, "$V_O$" and "$I_O$" are the output voltage and the output current of the DC voltage booster circuit 7, respectively, and "$v_O$" and "$i_O$" the output voltage and the output current of the high frequency booster circuit 8, respectively, as has already been explained. Further, "$i_l$" denotes the lamp current, "$i_2$" the current consumed in the trigger pulse generating section 9a of the igniter circuit 9 (which is what remains without the transformer 76), "L" the inductance of the secondary winding 76b of the transformer 76, and "C" the capacitance when the capacitive load in the igniter circuit 9 (the capacitors 79 and 81 provided in parallel to the secondary winding 76b) is equivalently converted as a capacitive load in series to the secondary winding 76b.

From the relation between the input and output powers of the high frequency booster circuit 8, the following will be obtained:

$$V_O \cdot I_O = v_O \cdot i_O \cdot \cos\phi + PL_{76} \tag{1}$$

where $\cos\phi$ is the power factor with respect to $v_O$ and $i_O$, and $PL_{76}$ is the power loss in the transformer 76. Since the power loss in the transformer in the high frequency booster circuit 8 does not affect the discrimination of the normal/abnormal state, it will be disregarded, assuming the transformer is an ideal one with 100% conversion efficiency (i.e., without any loss).

As $i_O$, $i_l$ and $i_2$ have the relationship $$i_O = i_l + i_2 \tag{2}$$

substituting the equation (2) into the equation (1) and expressing the consumed power in the trigger pulse generating section 9a as $A_{9a}(=v_O \cdot i_2 \cdot \cos\phi)$ yields $$V_O \cdot I_O = v_O \cdot i_l \cdot \cos\phi + A_{9a} + PL_{76} \tag{3}$$

A description will now be given of how the equation (3) is expressed in the following three abnormal statuses:
  i) When the lamp is short-circuited.
  ii) When the lamp is in an open-circuit state.
  iii) When the high frequency booster circuit 8 is an open-circuit state.

First, in the case i), the load of the booster circuit 8 is the current-limiting impedance (L, C) of the trigger pulse generating section 9a.

Thus, the consumed power of the load, "P", will be $$P = A_{9a} + v_O \cdot i_l \cdot \cos\phi$$

Since the contribution of C in the load impedance is smaller than that of L, however, the angle of power factor is $\phi = \pi/2$, which results in $P = A_{9a}$.

Thus, the equation (3) becomes $$V_O \cdot I_O = A_{9a} + PL_{76} \tag{3i}$$

This equation means that the power supplied to the booster circuit 8, $V_O \cdot I_O$, is almost consumed in the igniter circuit 9.

In the case ii), it is apparent that $i_l = 0$ and the consumed power of the load becomes $A_{9a}$. Thus, the equation (3) will be rewritten as $$V_O \cdot I_O = A_{9a} + PL_{76}$$

which is the same as in the case i).

In the last case iii), as $i_O = 0$, the equation (3) will be $$V_O \cdot I_O = 0 \tag{3iii}$$

(It should be noted that this is the case of considering the transformer of the booster circuit 8 as an ideal transformer.)

In view of the above, the equation (3i) is the most important in determining the decision line l.

Now let us check the voltage-dependency of $PL_{76}$ or the relation between $PL_{76}$ and $V_O$.

With regard to the power loss of the trigger transformer 76, neglecting the iron loss and considering only the copper loss, $$PL_{76} = i_1^2 \cdot r \quad (4)$$

where r (Ω) is a conductive resistance of the winding.

When the lamp is short-circuited, $i_1 > i_2$, and $1/(\omega \cdot C) > \omega \cdot L$ for the reactance where $\omega$ is the angular frequency for $v_O$ and $i_O$. Thus, $$i_1 = \frac{v_O}{|j \cdot \omega \cdot L|} \quad (5)$$

Since $v_O$ and $V_O$ can be expressed as $v_O = n \cdot V_O$ where n is the winding ratio, substituting this equation and the equation (5) into the equations (4) yields $$PL_{76} = \frac{n^2 \cdot r}{|\omega^2 \cdot L^2|} \cdot V_O^2 \quad (6)$$

Consideration will now be given to $A_{9a}$.

In the igniter circuit 9, during a half-wave period in which the potential at the AC output terminal 10 is negative and the potential at the AC output terminal 10' is positive, the capacitor 81 (its capacitance denoted by "$C_{81}$") is charged and the accumulated charge will be charged in the capacitor 79 (its capacitance denoted by "$C_{79}$") in the next half-wave period.

As $C_{81} < C_{79}$, a period of several cycles is required for the terminal voltage of the capacitor 79 to reach the breakdown voltage of the spark gap element 77. The consumed current $i_2$ in the trigger pulse generating section 9a can be approximated to the charge current of the capacitor 81, provided that the transient state is neglected. That is, since the equation $$i_2 = \frac{v_O}{|1/(j \cdot \omega \cdot C_{81})|} \quad (7)$$

can be formulized, the consumed power $A_{9a}$ in the igniter circuit 9 will be expressed as:

$$A_{9a} = v_O \cdot i_2 = n^2 \cdot \omega \cdot C_{81} \cdot V_O^2 \quad (8)$$

Thus, substituting the equations (6) and (8) into the equation (3i) yields $$V_O \cdot I_O = n^2 \cdot \omega \cdot C_{81} \cdot V_O^2 + \frac{n^2 \cdot r}{\omega^2 \cdot L^2} \cdot V_O^2 \quad (9)$$

$$\therefore I_O = k \cdot V_O$$

where $$k = n^2 \cdot \left( \omega \cdot C_{81} + \frac{r}{\omega^2 \cdot L^2} \right) \quad (10)$$

This equation (10) represents the decision line l. (The actual factor of proportionality is k in the equation (10) including a safety factor in light of the variation of lamps.)

When the lamp is properly lit, the consumed power P of the load becomes $$P = A_{9a} + i^2 \cdot R \quad (11)$$

where R is an equivalent resistance of the lamp. Since $$V_O \cdot I_O = A_{9a} + PL_{76} + i^2 \cdot R \quad (12)$$

is formulized, it is apparent that $$V_O \cdot I_O > A_{9a} + PL_{76} \quad (13)$$

or $$I_O > \frac{A_{9a} + PL_{76}}{V_O} = k \cdot V_O \quad (14)$$

can be expressed at the normal time.

Circuit Operation

The normality/abnormality discriminating operation of the abnormality judging circuit 18 is executed as follows.

First, the output voltage $V_O$ of the DC voltage booster circuit 7 is voltage-divided by the voltage-dividing resistors 33 and 33' to acquire a value of a current corresponding to $V_O$, i.e., a reference value for decision concerning the output current $I_O$ on the decision line l, then the voltage value of a current detection signal of the amplifier 15 is compared with this reference value by the comparator 31.

When the operational point ($V_O$, $I_O$) lies below the decision line l in the $V_O$-$I_O$ characteristic diagram and belongs to the region $B_A$, this is considered to be an abnormality (referring to the above-described points (i) to (iii)). The output signal of the comparator 31 becomes an L level, turning off the transistor 37. This charges the capacitor 41, and when the potential at the negative input terminal of the comparator 44 exceeds the reference voltage $E_1$, the output signal of the comparator 44 becomes an L level. As a result, the transistor 46 is turned off to thereby send an H signal to the signal holding circuit 25, rendering the transistor 24 off.

Consequently, the relay 23 is set off and the contact 6a is open, cutting off the supply of the battery voltage to the DC voltage booster circuit 7.

If the abnormality judging circuit 18 does not function though an abnormality has occurred in the lighting circuit, the protective function will be performed with the help of the double protection circuit 19.

The voltage value of a current detection signal of the amplifier 15 is compared with that of the reference voltage $E_2$ by the comparator 50. When the voltage of the detection signal is less than $E_2$, the output of the comparator 50 becomes an L level, turning off the transistor 52. This charges the capacitor 56, and when the potential at the terminal of the comparator 59 exceeds its reference voltage $E_3$, the transistor 61 is turned off.

As a result, an H signal is sent to the signal holding circuit 25 to thereby turn off the transistor 24. Consequently, the relay 23 is set off and the contact 6a is open, cutting off the supply of the battery voltage to the DC voltage booster circuit 7.

The capacitance of the capacitor 56 is so set that the double protection circuit 19 will not react when the output current $I_O$ is small at the beginning of lighting the lamp.

A description will now be given of the protecting operation by the output current abnormality detector 20 in a case where the output stage of the high frequency booster circuit 8 is short-circuited.

A detection signal concerning the output current $I_O$ of the DC voltage booster circuit 7 is supplied via the amplifier 15 to the comparator 72 of the circuit 20, and the reference voltage for comparison is varied in accordance with the level of the output voltage of the DC voltage booster circuit 7.

In other words, since the output current $I_O$ is large at the beginning of the lighting of the lamp even when the lighting circuit 1 is normally functioning, if the reference voltage for comparison in the comparator 72 is fixed, this status would erroneously be discriminated as an abnormality.

To clearly distinguish between the large output current $I_O$ at the beginning of the lighting in the normal time and the large output current $I_O$ in the normal state of the lamp (the latter originating from an abnormality in the circuit), the reference value of the comparator 72 is changed in accordance with the output voltage $V_O$ of the DC voltage booster circuit 7: the reference value is set large when $V_O$ is large and is set small when $V_O$ is small.

That is, when the output voltage $V_O$ of the booster circuit 7 is greater than the predetermined value, the Zener diode 65 when rendered conductive turns the transistor 67 on, turning off the transistor 68. Thus, the reference value for comparison of the comparator 72 is determined by the resistors 69, 69' and 70.

When $V_O$ is smaller than the predetermined value, on the other hand, the transistor 67 is rendered off, turning the transistor 68 on, so that the reference value of the comparator 72, determined by the resistors 69 and 70, apparently becomes smaller than the previous case.

In either case, when the H signal from the comparator 72 is sent via the diode 75 to the signal holding circuit 25, the transistor 24 is turned off, rendering the relay 23 off. As a result, the relay contact 6a is open, cutting off the supply of the battery voltage to the DC voltage booster circuit 7.

In short, according to the above-described lighting circuit 1, the output voltage $V_O$ of the DC voltage booster circuit 7 is detected, the value of the actual output current $I_O$ is compared with a reference value for the output current which is determined by the decision line l with respect to $V_O$, and the normal or abnormal status of the lighting circuit is discriminated depending on whether the operational point belongs to the area $B_N$ above the decision line l or the area $B_A$ below it. When it is judged that an abnormality has occurred, supplying the battery voltage to those circuits at the subsequent stages of the power cutoff relay circuit 6 is inhibited, thus protecting the lighting circuit as well as the lamp against the abnormality.

Further, since a judgment can be made on the normal or abnormal status of the lighting circuit using a single decision line l regardless of the above-described causes i) to iii) of abnormality, it is unnecessary to provide abnormality detectors for the individual causes of abnormality, thus simplifying the circuit structure.

Figure 5:
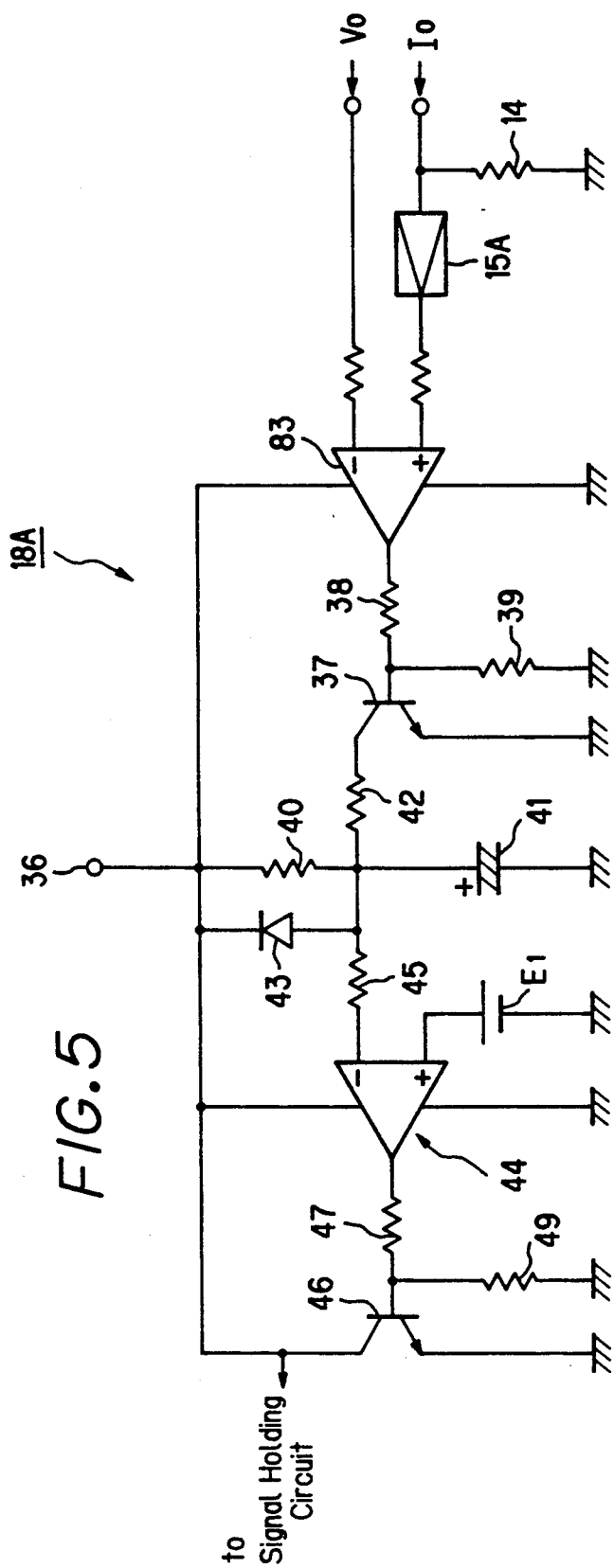

Modification (FIG. 5)

FIG. 5 illustrates a modification (18A) of the abnormality judging circuit.

The above-described abnormality judging circuit 18 judges the normal or abnormal circuit status by detecting the output voltage $V_O$ of the DC voltage booster circuit 7, acquiring a reference value of the output current $I_O$ corresponding to the output voltage $V_O$, then comparing the reference value with the actual output current $I_O$. The abnormality judging circuit 18A however judges whether or not an abnormality has occurred in the lighting circuit by acquiring a reference value for the output voltage $V_O$ corresponding to the output current $I_O$, then comparing this value with the actual output voltage $V_O$ In other words, since the normal or abnormal operational status of the lighting circuit is judged from the correlation between the output current according to the decision line l and the output voltage, based on one of the two factors, a reference value for the other factor has only to be obtained for later comparison with this other factor.

Referring to FIG. 5, a comparator 83 has a negative input terminal applied via a resistor with the output voltage $V_O$, and its positive input terminal supplied via a resistor with the output of the amplifier 15A. The switching of the transistor 37 is controlled by the output signal of the comparator 83.

Since the circuit at the subsequent stage of the transistor 37 has the same structure as the corresponding one in the abnormality judging circuit 18, the switching of the transistor 46 is controlled by the output of the comparator 44 in accordance with the result of comparison between the terminal voltage of the capacitor 41 and the reference voltage $E_1$.

In the abnormality judging circuit 18A, the output of the amplifier 15A is controlled to be the reference value ($I_O/k$) for the output voltage $V_O$ corresponding to the output current $I_O$ by selecting the gain of the amplifier 15A, the comparator 83 compares the reference value with the actual output voltage $V_O$.

In other words, when the operational point ($I_O$, $V_O$) belongs to the area BA, i.e., when $V_O > I_O/k$, the potential at the negative input terminal of the comparator 83 is higher than that at the positive input terminal, the transistor 37 is turned off by the L-level signal from the comparator 83.

As a result, the transistor 49 is turned off by the L-level signal from the comparator 44 located at the subsequent stage of the transistor 37, and an H-level signal is sent to the signal holding circuit 25. This opens the relay contact 6a to inhibit power supply to the DC voltage booster circuit 7, and this state continues.

When the operational point ($I_O$, $V_O$) belongs to the area $B_N$, the operation is quite reverse to the above operation, so that its description will be omitted.

According to the present invention, therefore, a judgment is made on whether or not the lighting circuit is normal or abnormal, based on the correlation between the output voltage and output current of the DC voltage booster circuit, and power supply to the discharge lamp is stopped when it is judged that some abnormality has occurred. It is therefore possible to protect the lighting circuit and discharge lamp as well as prevent the secondary damages originating from the abnormality. In addition, this can be realized without the need to provide an abnormality detecting circuit for every cause of the abnormality, ensuring the simplified circuit structure.

Although only one embodiment of a lighting circuit for a vehicular discharge lamp has been described herein, it should be apparent to those skilled in the art that the present invention may be embodied in many other specific forms without departing from the spirit or scope of the invention. That is, the present embodiment is to be considered as illustrative and not restrictive and the invention is not to be limited to the details given herein, but may be modified within the scope of the appended claims. For instance, although the power cutoff circuit is located at the preceding stage of the DC voltage booster circuit, the power cutoff relay circuit may be provided before the high frequency booster circuit. Further, it is possible to provide a circuit which inhibits power supply to the discharge lamp when the oscillation of the high frequency booster circuit is stopped.

What is claimed is:

1. A lighting circuit for a vehicular discharge lamp having a DC voltage booster circuit for boosting an input voltage from a DC voltage input terminal, comprising:
   a current detector for acquiring a detection signal directly representative of an output current of the DC voltage booster circuit;
   a voltage detector for acquiring a detection signal directly representative of an output voltage of the DC voltage booster circuit;
   an abnormality judging circuit for comparing levels of the detection signals from the current detector and the voltage detector with each other to determine whether or not the lighting circuit is in an abnormal status; and
   a power cutoff circuit for inhibiting power supply to the discharge lamp upon reception of a signal from the abnormality judging circuit representing an abnormality in the lighting circuit.

2. A lighting circuit for a vehicular discharge lamp having a DC voltage booster circuit for boosting an input voltage from a DC voltage input terminal, comprising:
   a detector for acquiring a detecting signal directly representative of an output current or output voltage of the DC voltage booster circuit;
   an abnormality judging circuit for detecting the output voltage or output current of the DC voltage booster circuit, acquiring a reference value directly representative of a corresponding output current or output voltage of the DC voltage booster circuit, and comparing the reference value with the level of the detection signal from the detector with each other to determine whether or not the lighting circuit is in an abnormal status; and
   a power cutoff circuit for inhibiting supply of a DC voltage to the DC voltage booster circuit upon reception of a signal from the abnormality judging circuit representing an abnormality in the lighting circuit.

3. A lighting circuit according to claim 1, further comprising:
   current abnormality detector for comparing the value of the detection signal directly representative of the output current of the DC voltage booster circuit with a second reference value to determine occurrence of an abnormality, and, upon judging that the abnormality has occurred, sending a signal to that effect to the power cutoff circuit to inhibit power supply to the DC voltage booster circuit.

4. A lighting circuit according to claim 1, further comprising:
   a double protection circuit for comparing a value of the detection signal directly representative of the output current of the DC voltage booster circuit with a first reference value and inhibiting power supply to the DC voltage booster circuit in accordance with a comparison result.

5. A lighting circuit according to claim 1 or 3, wherein the power cutoff circuit includes:
   a relay connected to the DC voltage booster circuit; and
   a signal holding circuit having an input terminal connected to the output current abnormality detector for holding a predetermined status of said input terminal to render the relay off to thereby cut off power supply to the DC voltage booster circuit.

6. A lighting circuit according to claim 1 or 3, wherein the power cutoff circuit includes:
   a relay connected to the DC voltage booster circuit; and
   a signal holding circuit having an input terminal connected to the abnormality judging circuit for holding a predetermined status of said input terminal to render the relay off to thereby cut off power supply to the DC voltage booster circuit.

7. A lighting circuit according to claim 1 or 3, wherein the abnormality judging circuit includes a comparator means for comparing the levels of the detection signals from the current detector and the voltage detector with each other to determine whether or not the lighting circuit is in an abnormal status, whereby, upon detection of the abnormal status, the abnormality judging circuit sends a signal to that effect to the power cutoff circuit to inhibit power supply to the DC voltage booster circuit.

8. A lighting circuit according to claim 4, wherein when a state that the output current of the DC voltage booster circuit is smaller than a predetermined level continues for a predetermined period of time or longer, the double protection circuit inhibits power supply to the DC voltage booster circuit.

9. A lighting circuit according to claim 8, further comprising a timer, connected to the double protection circuit, for counting the predetermined period of time and sending an output signal to the double protection circuit.

10. A lighting circuit according to claim 3, wherein the output current abnormality detector is capable of changing the second reference value to clearly, distinguish the value of the output current from the second reference value.

11. A lighting circuit according to claim 2, further comprising:
    an output current abnormality detector for comparing the value of the detection signal directly representative of the output current of the DC voltage booster circuit with a second reference value to determine occurrence of an abnormality, and, upon judging that the abnormality has occurred, sending a signal to that effect to the power cutoff circuit to inhibit power supply to the DC voltage booster circuit.

12. A lighting circuit according to claim 2, further comprising:

a double protection circuit for comparing a value of the detection signal directly representative of the output current of the DC voltage booster circuit with a first reference value and inhibiting power supply to the DC voltage booster circuit in accordance with a comparison result.

13. A lighting circuit according to claim 2 or 9, wherein the power cutoff circuit includes:
a relay connected to the DC voltage booster circuit; and
a signal holding circuit having an input terminal connected to the output current abnormality detector for holding a predetermined status of said input terminal to render the relay off to thereby cut off power supply to the DC voltage booster circuit.

14. A lighting circuit according to claim 2 or 9, wherein the power cutoff circuit includes:
a relay connected to the DC voltage booster circuit; and
a signal holding circuit having an input terminal connected to the abnormality judging circuit for holding a predetermined status of said input terminal to render the relay off to thereby cut off power supply to the DC voltage booster circuit.

15. A lighting circuit according to claim 2 or 11, wherein the abnormality judging circuit includes a comparator means for comparing the levels of the detection signals from the current detector and the voltage detector with each other to determine whether or not the lighting circuit is in an abnormal status, whereby, upon detection of the abnormal status, the abnormality judging circuit sends a signal to that effect to the power cutoff circuit to inhibit power supply to the DC voltage booster circuit.

16. A lighting circuit according to claim 11, wherein when a state that the output current of the DC voltage booster circuit is smaller than a predetermined level continues for a predetermined period of time or longer, the double protection circuit inhibits power supply to the DC voltage booster circuit.

17. A lighting circuit according to claim 16, further comprising a timer, connected to the double protection circuit, for counting the predetermined period of time and sending an output signal to the double protection circuit.

18. A lighting circuit according to claim 11, wherein the output current abnormality detector is capable of changing the second reference value to clearly distinguish the value of the output current from the second reference value.

* * * * *